(12) United States Patent
Morgenthaler

(10) Patent No.: US 9,034,182 B2
(45) Date of Patent: May 19, 2015

(54) DEEPWATER DISPERSION SYSTEM AND METHOD OF USING SAME BACKGROUND

(75) Inventor: Lee Nickey Morgenthaler, Houston, TX (US)

(73) Assignee: Shell Oil Company, Houston, TX (US)

(*) Notice: Subject to any disclaimer, the term of this patent is extended or adjusted under 35 U.S.C. 154(b) by 579 days.

(21) Appl. No.: 13/214,894

(22) Filed: Aug. 22, 2011

(65) Prior Publication Data
US 2012/0217195 A1    Aug. 30, 2012

Related U.S. Application Data

(60) Provisional application No. 61/376,581, filed on Aug. 24, 2010.

(51) Int. Cl.
| | |
|---|---|
| C02F 1/40 | (2006.01) |
| E21B 43/01 | (2006.01) |
| C02F 1/68 | (2006.01) |
| C02F 101/32 | (2006.01) |
| C02F 103/36 | (2006.01) |

(52) U.S. Cl.
CPC ............. *E21B 43/0122* (2013.01); *C02F 1/682* (2013.01); *C02F 1/40* (2013.01); *C02F 2101/32* (2013.01); *C02F 2103/365* (2013.01); *C02F 2201/008* (2013.01)

(58) Field of Classification Search
CPC ............ C02F 1/40; C02F 1/682; C02F 1/686; C02F 2101/32; C02F 2101/322; C02F 2101/325; C02F 2103/007; C02F 2103/10; C02F 2103/365; C02F 2201/008; C02F 2305/04; B01D 17/04; E02B 15/041; E02B 15/08; E21B 43/0122
USPC .................. 210/170.05, 170.11, 242.1, 747.5, 210/747.6; 114/321, 322, 337, 338; 405/210
See application file for complete search history.

(56) References Cited

U.S. PATENT DOCUMENTS

| | | | |
|---|---|---|---|
| 4,126,547 A | 11/1978 | Kuris | 210/19 |
| 4,978,459 A | 12/1990 | Bock et al. | 210/749 |
| 5,422,011 A | 6/1995 | Avila | 210/706 |
| 6,261,463 B1 | 7/2001 | Jacob et al. | 210/749 |
| 6,517,726 B2 | 2/2003 | Allen et al. | 210/749 |
| 2002/0005439 A1 | 1/2002 | Kendall | 239/223 |
| 2009/0045148 A1* | 2/2009 | de Strulle | 210/774 |
| 2010/0016452 A1 | 1/2010 | Nedwed et al. | 516/63 |

* cited by examiner

*Primary Examiner* — Lucas Stelling

(57) ABSTRACT

A system comprising a surface vessel floating on a body of water; an oil leak located in the body of water; a remotely operated vehicle located near the oil leak; a connection between the surface vessel and the remotely operated vehicle; wherein the remotely operated vehicle comprises a mixer and a dispersant injector.

4 Claims, 9 Drawing Sheets

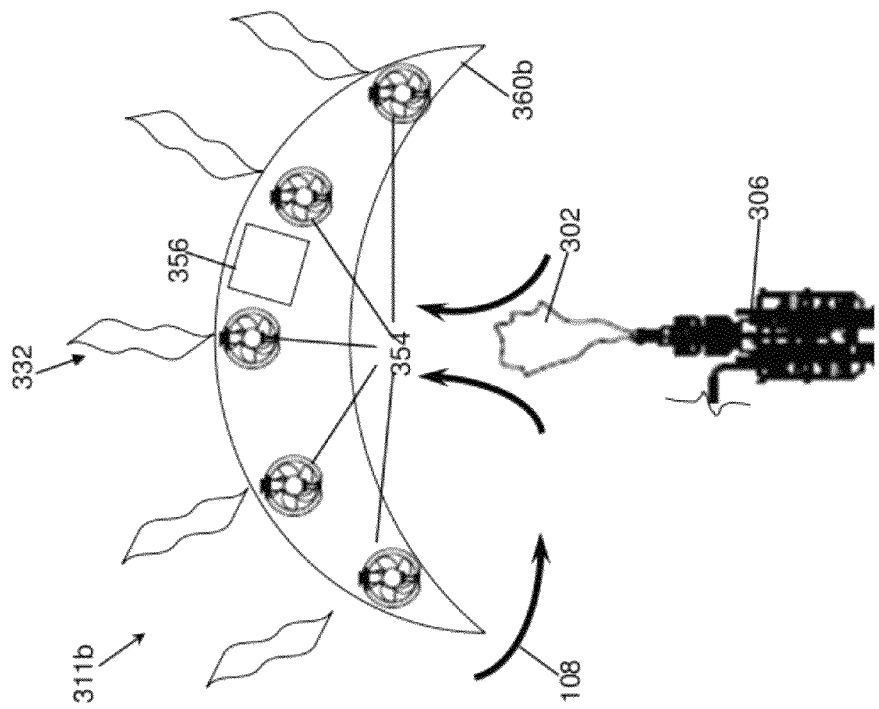
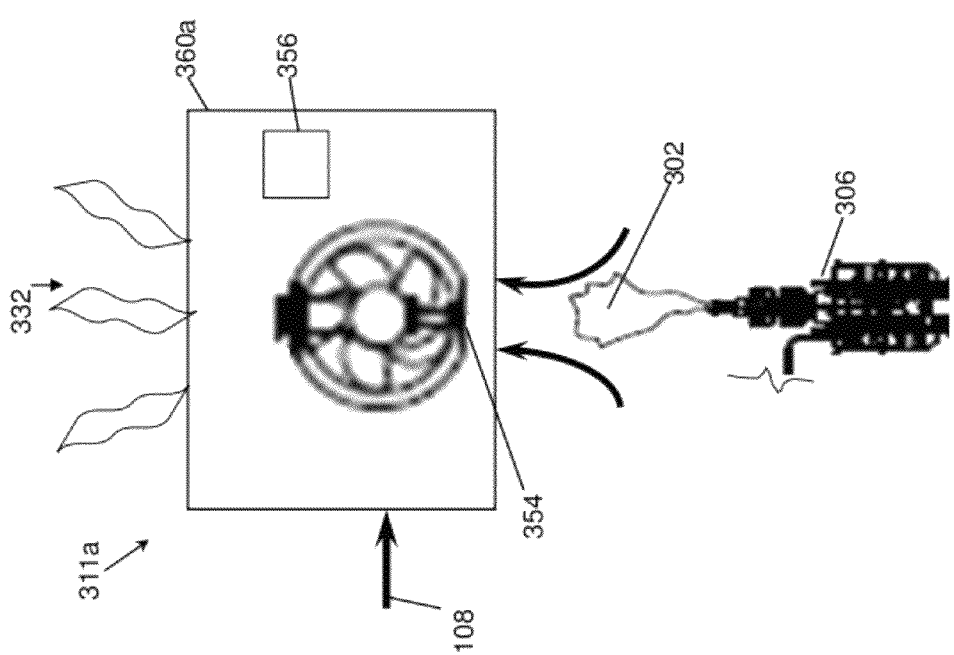
FIGURE 3B
FIGURE 3A

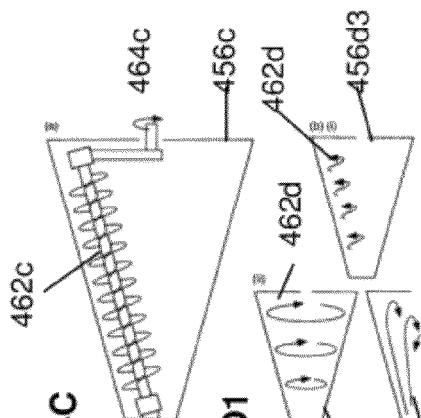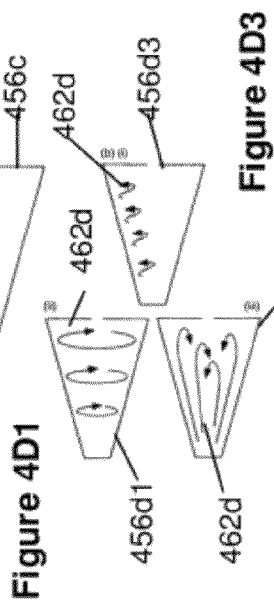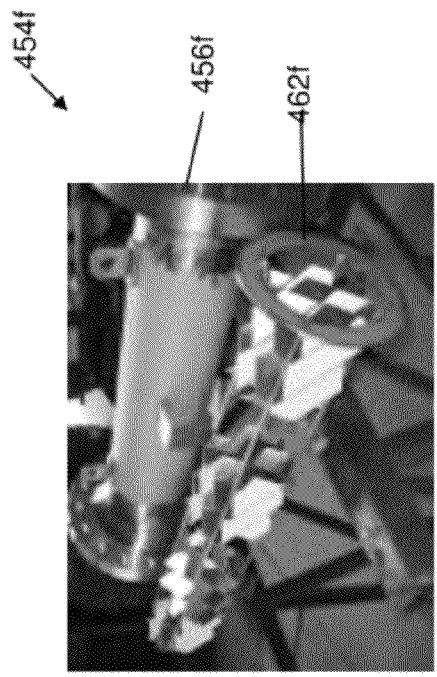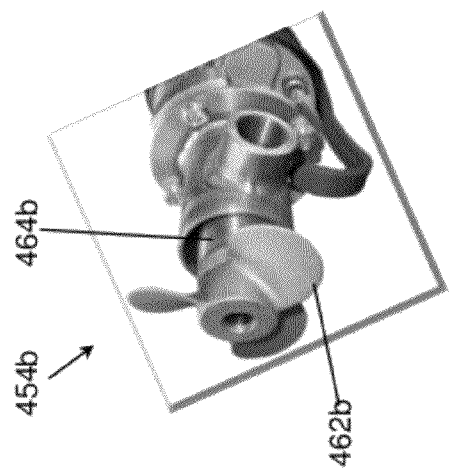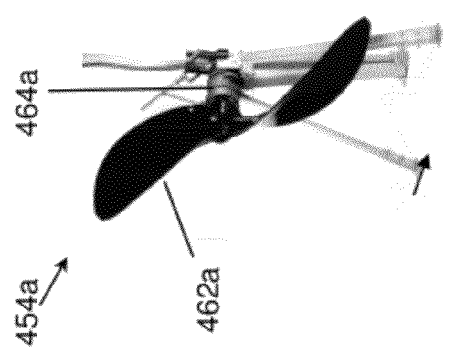

500 Method of Dispersion

570 – Positioning a dispersant system about a leaking fluid at a wellsite

572 – Deploying dispersion wand about the leaking fluid

574 - Dispersing a propellant from the dispersion wand and into the leaking fluid 576 – Passing the propellant and leaking fluid into a mixer 578 – Mixing the propellant with the leaking fluid to form a leak mixture having a small particle size 580 – Releasing the leak mixture into the sea for biodegradation

FIGURE 5

DEEPWATER DISPERSION SYSTEM AND METHOD OF USING SAME

BACKGROUND

This application claims the benefit of U.S. Provisional Application No. 61/376,581 filed Aug. 24, 2010, the entire disclosure of which is hereby incorporated by reference.

BACKGROUND

U.S. Patent Application Publication U.S. 2010/0016452 discloses an agent and a method for dispersing spilled oil, particularly on a body of water. The compound is a viscous dispersant liquid comprising a mixture of surfactants and a viscosifying agent that may be stored, shipped, mixed, and delivered on site using standard equipment and methods. The compound is released as a cohesive, persistent, visible, gel-like or paste-like liquid that floats on water. At least one method includes delivering the viscous dispersant liquid onto an oil spill in a body of water utilizing a jet airplane flying at over about 100 feet and spraying the liquid in large, pea-sized droplets. U.S. Patent Application Publication US 2010/0016452 is herein incorporated by reference in its entirety.

U.S. Pat. No. 6,517,726 discloses a method and apparatus for depositing a chemical over a body of water. It discloses collecting and concentrating a floating contaminant between two floating booms pulled by one or more surface vessels. The booms define an aperture intermediate of their endpoints, and the towing of the boom results in the flow of concentrated contaminant through the aperture. One or more nozzles proximate the aperture deposit a chemical, such as a liquid dispersant, on the contaminant and water flowing through the aperture. It also discloses a mixing apparatus placed at aft of the aperture for inducing mixing of the deposited chemical and the floating contaminant. U.S. Pat. No. 6,517,726 is herein incorporated by reference in its entirety.

U.S. Patent Application Publication U.S. 2002/0005439 discloses an apparatus and method for applying undiluted chemical dispersant to a waterborne oil spill using a gentle uniform rain producing nozzle consisting of a rotating element having teeth to break up the fluid stream in to gentle uniform rain-sized droplets having a minimum diameter for uniform dispersal over a wide area. The novelty of this invention is that it is the only neat spray dispersant apparatus and method specifying dispersal through a moving element configured nozzle having an adjustable flow rate. The apparatus is skid mounted and portable. It comprises a pump to suction dispersant from tanks or other receptacles where it is stored and pressurize the dispersant, a pressure manifold that allows the dispersant to pressurize and a monitor or hose attachment hydraulically connecting the pressure manifold to one or more configured nozzles that distribute the chemical dispersant upon the oil spill. The method comprises pressurizing dispersant and spraying it through a configured nozzle onto the oil spill. U.S. Patent Application Publication U.S. 2002/0005439 is herein incorporated by reference in its entirety.

U.S. Pat. No. 6,261,463 discloses an effective and non-toxic oil spill dispersant combines a predominately oil-soluble surfactant (eg., polyethylene glycol mono-oleate) with a predominately water-soluble surfactant (eg., cocoamide) and a co-solvent for coupling a mixture of the predominately oil-soluble surfactant and the oil spill, with the predominately water-soluble surfactant. Water is included in the combination to help advance the interaction between the predominately oil-soluble surfactant and the predominately water-soluble surfactant as well as the co-solvent. The water component also helps reduce the viscosity of the dispersant to allow it to be pumped under pressure. U.S. Pat. No. 6,261,463 is herein incorporated by reference in its entirety.

U.S. Pat. No. 5,422,011 discloses a method for recuperating crude oil from the body of a spill. First, the body of the spill is sprayed at low pressure then the same operation is done at a relatively higher pressure of at least 100 p.s.i. After the dispersant is allowed to penetrate the body of the spill for several hours, physical agitation of the body of the spill is induced the use of air compressors operating in the range between 500 and 700 psi causing the crude oil to disperse and come to the surface. The crude oil is then extracted from the spill through the use of skimmers and vacuum suction means and subsequently processed. U.S. Pat. No. 5,422,011 is herein incorporated by reference in its entirety.

U.S. Pat. No. 4,978,459 discloses a method for dispersing an oil spill on sea water, which method comprises applying to the oil spill surface an effective amount of: (i) a blend of one or more hydrophilic and one or more lipophilic surfactants so balanced that they will form microemulsions with the sea water and the oil to be dispersed; (ii) a solvent which is miscible with the oil to be dispersed and in which the blend of surfactants is substantially soluble; and (iii) from 0 to about 10 weight percent water, wherein the blend of surfactants is such that it lowers the interfacial tension between the oil to be dispersed and the sea water to less than about 250 mdynes/cm when the blend is used at a treat rate of less than about 1 to 100 by weight, based on the oil to be dispersed, wherein the solvent is a hydrocarbon solvent selected from the group consisting of No. 2 diesel fuel oil, kerosene and white oil. U.S. Pat. No. 4,978,459 is herein incorporated by reference in its entirety.

U.S. Pat. No. 4,126,547 discloses that oil slicks on surface waters are dispersed by the exposure of the surface oils to ultrasonic energy to effectuate an homogenization of the oil and water to permit absorption of the oil within the total volume of water. U.S. Pat. No. 4,126,547 is herein incorporated by reference in its entirety.

SUMMARY OF THE INVENTION

One aspect of the invention provides a system comprising a surface vessel floating on a body of water; an oil leak located in the body of water; a remotely operated vehicle located near the oil leak; a connection between the surface vessel and the remotely operated vehicle; wherein the remotely operated vehicle comprises a mixer and a dispersant injector.

Another aspect of the invention provides a system comprising an oil leak located in a body of water; a dispersant storage vessel located near the oil leak; a power supply located near the oil leak; a pump located near the oil leak fluidly connected to the dispersant storage vessel, and connected to the power supply; a mixer located near the oil leak; a dispersant injection nozzle comprising an outlet near the mixer, and comprising an inlet fluidly connected to the dispersant storage vessel and the pump, wherein the pump conveys dispersant from the dispersant storage vessel to the dispersant injection nozzle.

Another aspect of the invention provides a system comprising an oil leak located in a body of water; a vessel floating in the body of water; a dispersant storage vessel located on the vessel; a power supply located on the vessel; a pump located on the vessel, fluidly connected to the dispersant storage vessel, and connected to the power supply; a mixer located near the oil leak; a dispersant injection nozzle comprising an outlet near the mixer, and comprising an inlet fluidly connected to the dispersant storage vessel and the pump, wherein the pump conveys dispersant from the dispersant storage vessel to the dispersant injection nozzle.

BRIEF DESCRIPTION OF THE DRAWINGS

So that the features and advantages of the present invention can be understood in detail, a more particular description of the invention may be had by reference to the embodiments thereof that are illustrated in the appended drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIGS. 3A and 3B are schematic diagrams depicting various mixers usable with the dispersion system of FIGS. 1A and/or 1B.

FIGS. 4A-4F are schematic diagrams depicting various views of agitators usable with the mixers of FIGS. 3A and/or 3B.

FIG. 5 is a flow chart depicting a method of deepwater dispersion.

DETAILED DESCRIPTION

Presently preferred embodiments of the invention are shown in the above-identified figures and described in detail below. Embodiments are described with reference to certain features and techniques for containing fluids released into the sea.

Figure 1A:
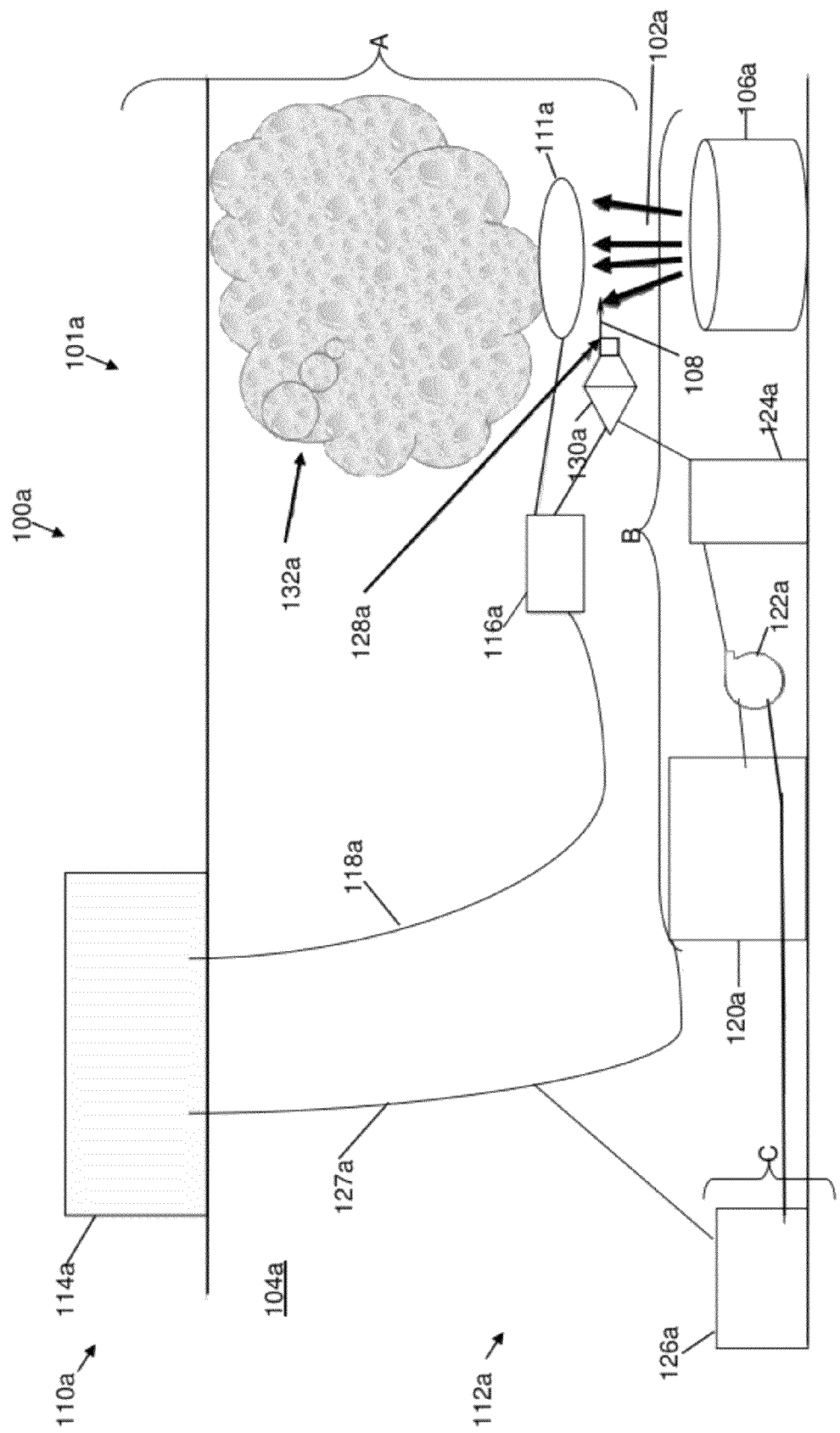
FIGS. 1A and 1B are schematic diagrams depicting alternate views of a wellsite positioned about a subsea reservoir, the wellsite having a dispersion system in accordance with an aspect of the present invention.

FIG. 1A:

FIG. 1A is a schematic diagram depicting a wellsite 100a provided with a dispersion system 101a for treating a leaking fluid 102a emerging from a discharge source 106a and into the sea 104a. The dispersion system 101a is configured to disperse a dispersant 108 from a surface dispersion unit 110a and/or a subsea dispersion unit 112a. The dispersion system 101a is also provided with a mixer 111a for mixing the leaking fluid 102a with the dispersant 108. The dispersion system 101a is preferably configured to maximize mechanical dispersion, improve mixing and enhance performance of the dispersant 108.

The dispersion system 101a is preferably a mobile system deployable to one or more locations for use. The surface dispersion unit 110a includes one or more vessels 114a floating on the sea 104a, with one or more remote operated vehicles (ROV) 116a deployed therefrom via one or more umbilicals 118a (e.g., coiled tubing). The vessel 114a may be any vessel capable of deploying the equipment and performing the dispersion operations provided herein, such as a ROLLS ROYCE™ UT 719-2. The ROV 116a may be a commercially available ROV capable of performing subsea operations as needed. The vessel 114a may have chemical storage thereon for containing the dispersant 108 as will be described further herein. The surface dispersion unit 110a is preferably capable of activating an ROV 116a and/or subsea dispersion unit 112a for emitting dispersant 108.

The subsea dispersion unit 112a includes a subsea bladder tank 120a, subsea pump 122a connectable to a subsea manifold 124a, and power pack 126a. The subsea bladder tank 120a may be a conventional storage bladder for containing chemicals, such as the dispersant 108. The subsea bladder tank 120a and the power pack 126a may be linked to the surface dispersion unit 110a by cable 127a for passing power and communication signals therebetween. The subsea bladder tank 120a may also receive dispersant from the vessel 114a via the cable 127a.

The surface/subsea dispersion units 110a,112a have a wand 130a for releasing the dispersant 108 into the leaking fluid 102a. The surface dispersion unit 110a and subsea dispersion unit 112a may be linked to the same or separate wand 130a. The wand 130a has a nozzle (or dispersion head) 128a for emitting a jet of dispersant 108 into the leaking fluid 102a. The nozzle 128a is preferably capable of jetting the dispersant 108 into the leaking fluid 102a to break the leaking fluid 102a into fine droplets. The dispersant 108 may be any conventional dispersant or chemical dispersant capable of breaking down hydrocarbons in the sea 104a. Preferably, the dispersant is capable of entraining oil in about 30 micron bubbles that biodegrade naturally in the sea 104a. Suitable dispersants are commercially available from Nalco, Baker Hughes, Clariant, and Champion.

The power pack 126a may receive power from the vessel 114a via cable 127a and/or have batteries for powering the subsea dispersion unit 112a. The power pack 126a may include, for example, one or more hydraulic accumulators. Power pack 126a may be used to power and/or control the operation of the subsea dispersion unit 112a and/or the release of dispersant 108 from the wand 130a. Subsea pump 122a may be used to pump dispersant 108 from the subsea bladder 120a and to the wand 130a for distribution. The pump 122a may be linked through manifold 124a for manipulating the flow of dispersant 108. The manifold 124a may be fluidly linked to wand 130a to distribute the dispersant 108.

The leaking fluid 102a and the dispersant 108 from nozzle 128a pass into mixer 111a for mixing therein. The mixer 111a preferably facilitates interaction between the leaking fluid 102a and the dispersant 108. The mixing action may be used to distribute the dispersant 108 through the leaking fluid 102a and/or to break up the leaking fluid 102a into particles (or droplets) 132a for release into the sea 104a. The mixer 111a preferably mixes the dispersant 108a with the leaking fluid 102a sufficiently to break the leaking fluid 102a into small enough particles 132a (e.g., about 1 to 30 microns in diameter) and form a mixture for distribution into the sea 104a. The particles 132a may be broken into small particles 132a that form a cloud of droplets that will further disperse into the sea 104a over time. The particles 132a are also preferably small enough for natural biodegradation, for example, to be eaten by microbes.

As shown in FIG. 1A, the dispersion system 101a may be activated in phases A-C. In phase A, the surface dispersion unit 110a is positioned at the wellsite 100a, with the ROV 116a and the mixer 111a deployed into position about leaking fluid 102a, where ROV 116a can actuate wand 130a and mixer 111a. In phase B, the subsea dispersion unit 112b is placed in position. In phase C, the power pack 126a is activated to power the dispersion system 101a and begin dispersion.

Figure 1B:
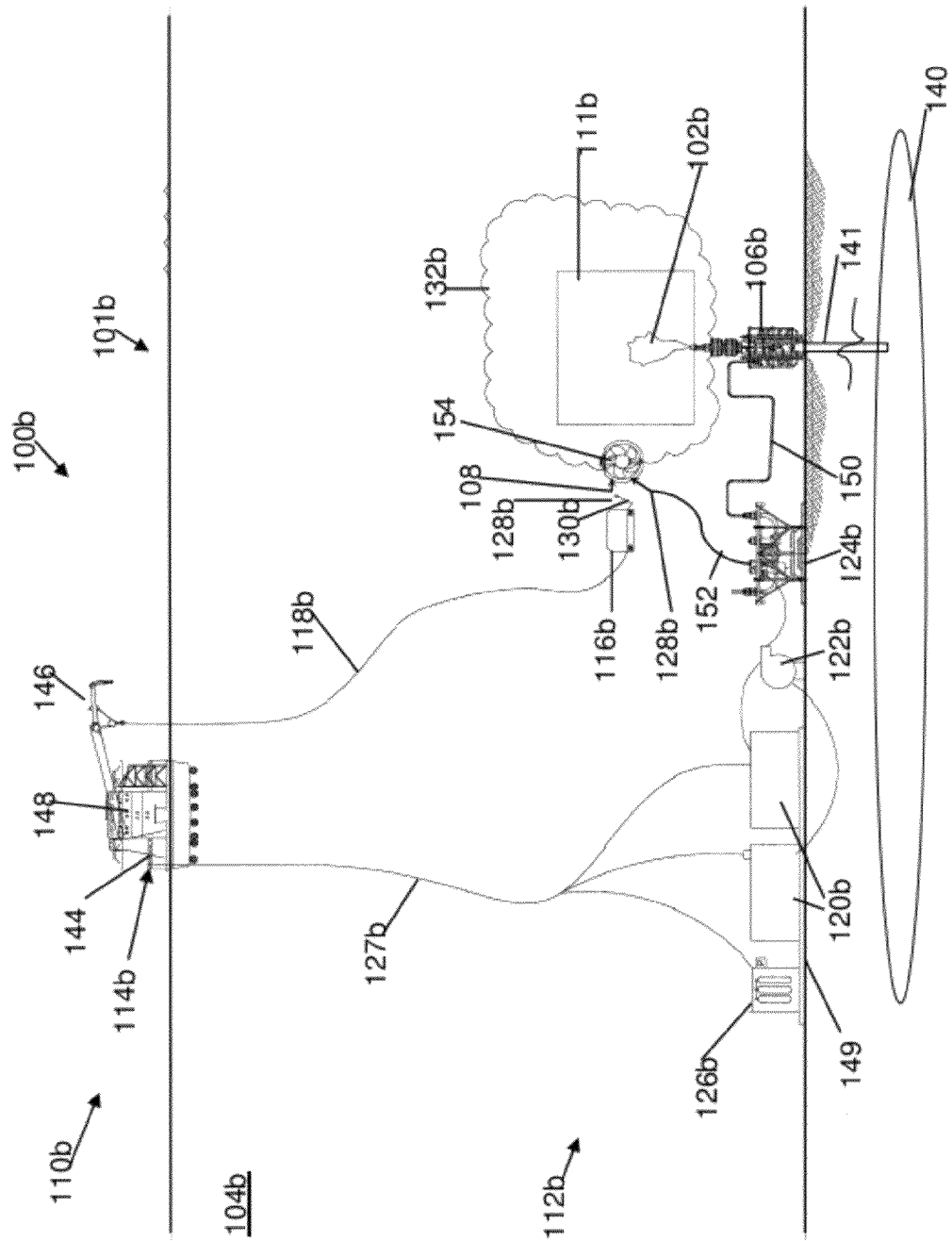
Figure 2E:
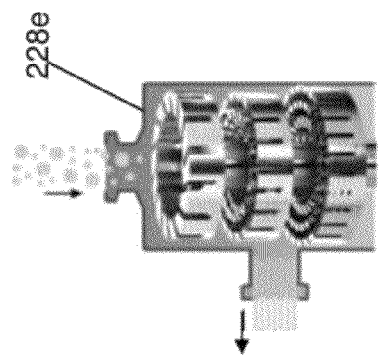
FIGS. 2A-2E are schematic diagrams depicting various views of nozzles (or dispersion heads) usable with the dispersion system of FIGS. 1A and/or 1B.
Figure 2B:
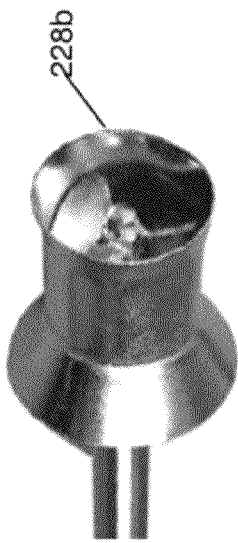
Figure 2D:
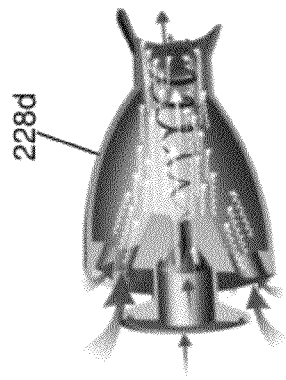
Figure 2A:
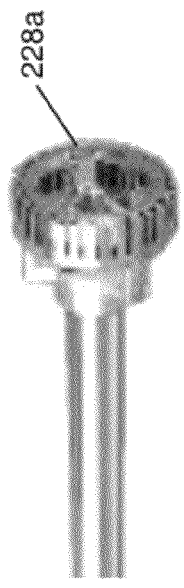
Figure 2C:
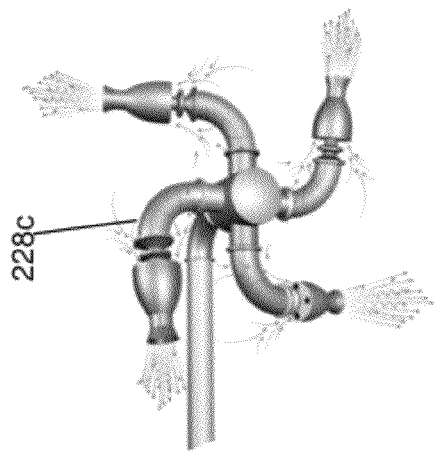

FIG. 1B:

FIG. 1B is a schematic diagram depicting a wellsite 100b positioned above a subsea reservoir 140. A wellbore 141 extends from the reservoir 140 to a BOP 106b. The wellsite 100b has a dispersion system 101b, surface dispersion unit 110*b* and subsea dispersion unit 112*b* that may have be the same as the dispersion system 101*a*, surface dispersion unit 110*a* and/or a subsea dispersion unit 112*a* of FIG. 1A. More particularly, the leaking fluid 102*b*, discharge source 106*b*, mixer 111*b*, vessel 114*b*, ROV 116*b*, umbilical 118*b*, subsea bladder 120*b*, subsea pump 122*b*, manifold 124*b*, power source 126*b*, wand 130*b*, nozzle 128*b*, and particles 132*b* may be the same as the leaking fluid 102*a*, discharge source 106*a*, mixer 111*a*, vessel 114*a*, ROV 116*a*, umbilical 118*a*, subsea bladder 120*a*, subsea pump 122*a*, manifold 124*a*, power source 126*a*, wand 130*a*, nozzle 128*a*, and particles 132*a* previously described herein.

In the configuration of FIG. 1B, the vessel 114*b* has a surface bladder 144, a crane 146, and electronics 148. The surface bladder 144 may be a conventional bladder used for chemical storage. The crane 146 may be a conventional crane, such as a compensated crane, usable in offshore applications for deploying equipment into the sea 104*b*. Various equipment and ropes, such as the ODIM Cable Traction Control Unit (CTCU™), the Fiber Rope Deployment System (FRDS™), and other cable control equipment, may be used to deploy components of the surface/subsea dispersion units 110*b*, 112*b*.

The electronics 148 may be, for example, electrical components such as controllers, processors or other devices, for operating the ROV 116*b*, the subsea dispersion unit 112*b* and/or one or more subsea components at the wellsite 100*b*. The electronics 148 may further include communication systems, such as transceivers, for communicating with the components of the wellsite 100*b* and/or with offsite locations. Umbilical 118*b* (e.g., coil tubing) may provide a link between the electronics 148 and the ROV 116*b*. Cable 127*b* may provide a link between the vessel 114*b* and the subsea dispersion unit 112*b*. Similar features may be provided for the wellsite 100*a*.

As further shown in FIG. 1B, the subsea dispersion unit 112*b* may be positioned on a mud mat (or subsea sled) 149 based on the sea floor. The subsea dispersion unit 112*b* may be fluidly connected to the surface bladder 144 for receiving dispersant 108 therefrom. The subsea dispersion unit 112*b* may have one or more bladders 120*b* linked to pump 122*b* for providing dispersant 108. Manifold 124*b* may be fluidly connected between pump 122*b* and discharge source 106*b* for fluid communication therebetween. Manifold 124*b* may be linked via piping 150 for passing dispersant 108 to the discharge source 106*b*. The manifold 124*b* may also be linked via tubing 152 to the wand 130*b* for emitting a jet of dispersion from the nozzle 128*b*. One or more wands 130*b* with nozzles 128*b* may be provided for use by the surface and/or subsea dispersion units 110*b*, 112*b*. An agitator 154 may be provided to break up the dispersant 108 as it is passed into the mixer 111*b* and/or to facilitate mixing of the dispersant 108 and the leaking fluid 102*b*.

FIGS. 2*a*-2*e*:

FIGS. 2*a*, 2*b*, 2*c*, 2*d*, and 2*e* depict examples of nozzles 228*a*-*e* usable as the nozzle 128*a*,*b* of FIGS. 1A and 1B. The nozzle 228*a*-*e* may be configured to emit a jet of dispersant 108. Any nozzle capable of connection with the wand 130*a*,*b*, umbilical 118*a*,*b*, tubing 152 or other fluid source for releasing dispersant 108 may be used. Preferably, the selected nozzle is capable of pressurizing the dispersant to achieve a desired flow rate sufficient to interact with the leaking fluid (e.g., 102*a*,*b* of FIGS. 1A and/or 1B). In some cases, the nozzle may be positioned to spray dispersant into a leaking fluid 102*a* as shown in FIG. 1A. In some cases, the nozzle may be positioned to spray dispersant into a mixer 111*b* for mixing with the leaking fluid 102*b* therein as shown in FIG. 1B. The nozzle 228*a*-*e* may be selected based on the particular application.

FIGS. 3A & 3B:

FIGS. 3A and 3B are schematic diagrams depicting mixers 311*a*,*b*, respectively, usable with the surface and/or subsea dispersion units 110*a*,*b*,112*a*,*b* of FIGS. 1A and 1B. The mixers 311*a*,*b* each have mixer housing 360*a*,*b* with agitator(s) 354, and a motor 356 for driving the agitator 354. The mixers 311*a*,*b* may be positioned about (preferably above) a discharge source 306 for receiving a leaking fluid 302 therefrom. The agitators 354, discharge sources 306, and leaking fluid 302 may be the same as the agitator 154, discharge sources 106*a*,*b* and leaking fluid 102*a*,*b*, respectively, as previously described herein. The mixers 311*a*,*b* may also operate in the same manner as the mixers 111*a*,*b* of FIGS. 1A and/or 1B.

As shown in FIG. 3A, mixer 311*a* is a rectangular or box-shaped mixer positionable above the discharge source 306. As shown in FIG. 3B, the mixer 311*b* is a dome-shaped mixer positionable above the discharge source 306. The leaking fluid 302 flows into the mixers 311*a*,*b* as indicated by the directional arrows. The mixers 311*a*,*b* may have open bottoms for receiving the leaking fluid 302 and/or sea water. Alternatively, the mixers 311*a*,*b* may have inlets, outlets and/or channels therethrough for passage of the leaking fluid 302, sea water, and dispersant 108 therethrough. A pump (not shown) may be provided to encourage the leaking fluid 302 to flow into the mixers 311*a*,*b* at a desired rate.

The dispersant 108 may be passed into the mixers 311*a*,*b* and/or into the leaking fluid 302 for interaction therewith as schematically indicated by the directional arrow. The dispersant 108 and leaking fluid 302 may be mixed by rotation of the agitator(s) 354 by motor 356. This rotation or agitation of the dispersant 108, sea water, and leaking fluid 302 breaks the leaking fluid 302 into smaller particles 332. The particles 332 are released from the mixers 311*a*,*b* and into the sea. The particles 332 may be in a stream or a cloud, and disperse through the sea over time.

FIGS. 4A-4F:

FIGS. 4A-4F depict the various agitators 454*a*-*f* that may be used as the agitator 154 of FIG. 1B and/or the agitator(s) 354 of FIGS. 3A, 3B. Any of these agitators may be used in combination with any mixer (e.g., 111*a*,*b* of FIGS. 1A,1B and/or 311*a*,*b* of FIGS. 3A,3B). The selected agitator(s) may be positioned outside of the mixer and adjacent the leaking fluid (e.g., 102*a*,*b* of FIGS. 1A,1B and/or 302 of FIGS. 3A,3B). In some cases, fluid pathways, channels or tubes may also be provided in the mixers to direct the fluid therethrough. In such cases, the selected agitator(s) may be positioned in or about such fluid pathways, channels or tubes.

FIGS. 4A and 4B show examples of agitators 454*a*,*b* including a propeller blade 462*a*,*b* rotationally driven about a shaft 464*a*,*b*, respectively. A motor (e.g., 356 of FIGS. 3A and 3B) may be used to drive the rotating shaft 464*a*,*b*. Fluid passing over the propeller blades 462*a*,*b* may be broken up by the chopping action of the propeller blades 462*a*,*b*.

FIG. 4C-4F show examples of agitators 454*c*-*f* that include rotor blades 462*c*-*f*. Figure C depicts an agitator 454*c* including a rotor blade 462*c* positioned in a rotor tube 456*c*. The rotor blade 462*c* may be rotationally driven by rotating shaft 464*c*. The rotor tube 456*c* may be positioned in a mixer for passage of the dispersant and leaking fluid therethrough. FIGS. 4D1-4D3 show the rotor tube 456*d*1-*d*3 with various examples of flow patterns that may be generated by flow as a rotor blade 462*d* (which may be the same as rotor blade 462*c*) is rotated in the rotor tubes 456*d*1-3. The rotor blade 462*d* breaks up the fluid in the rotor tube 456*d*1-3 as it cycles therethrough. FIGS. 4E1 and 4E2 show agitators 454*e*1,*e*2 with rotor blades 462*e*1,*e*2 (which may be the same as rotor blades 462*c*,*d*). These figures depict the break up of the fluid as it passes over the rotor blades 462*e*1, *e*2. FIG. 4F shows an example of an agitator 454*f* that includes a rotor blade 462*f* and a corresponding rotor tube 456*f*.

FIG. 5:

FIG. 5 is a flow chart depicting a method 500 of deepwater dispersion. The method involves positioning (570) a dispersion system (e.g., 101*a*,*b*) about a leaking fluid (e.g., 102*a*,*b*, 302) at a wellsite. In some cases, an ROV (e.g., 116*a*,*b*) may be deployed to disperse dispersant and/or to operate a mixer. In some cases, the ROV may be used solely for installing the subsea dispersion system (e.g., 112*a*,*b*), and removed therefrom without performing any dispersion. To simplify installation, at least some of the components of the subsea dispersion unit (112*b*) may be pre-assembled and positioned on a mud mat (e.g., 149) and deployed into the sea as a single entity during installation. This deployment may be performed, for example, using buoyancy assisted deployment.

The method may also involve deploying (572) a dispersion wand (e.g., 130*a*,*b*) about the leaking fluid. The dispersion wand may be deployed from a surface and/or a subsea dispersion unit (e.g., 110*a*,*b*, 112*a*,*b*). The method may further involve dispersing (574) a dispersant from the dispersion wand and into the leaking fluid, and passing (576) the dispersant and leaking fluid into a mixer (e.g., 111*a*,*b*, 311). The dispersant may be mixed (578) with the leaking fluid to form a leak mixture (e.g., 132*a*,*b*, 332) having a small particle size. The leak mixture may be released (580) into the sea for biodegradation.

Once the subsea dispersion unit (e.g., 112*b*) is in position, the surface dispersion unit (e.g., 110*a*,*b*) can be removed. The surface dispersion unit may be deployed for performing operations on new or existing wellsites. The steps of the method may be performed in any order, and repeated as desired.

Figure 6:
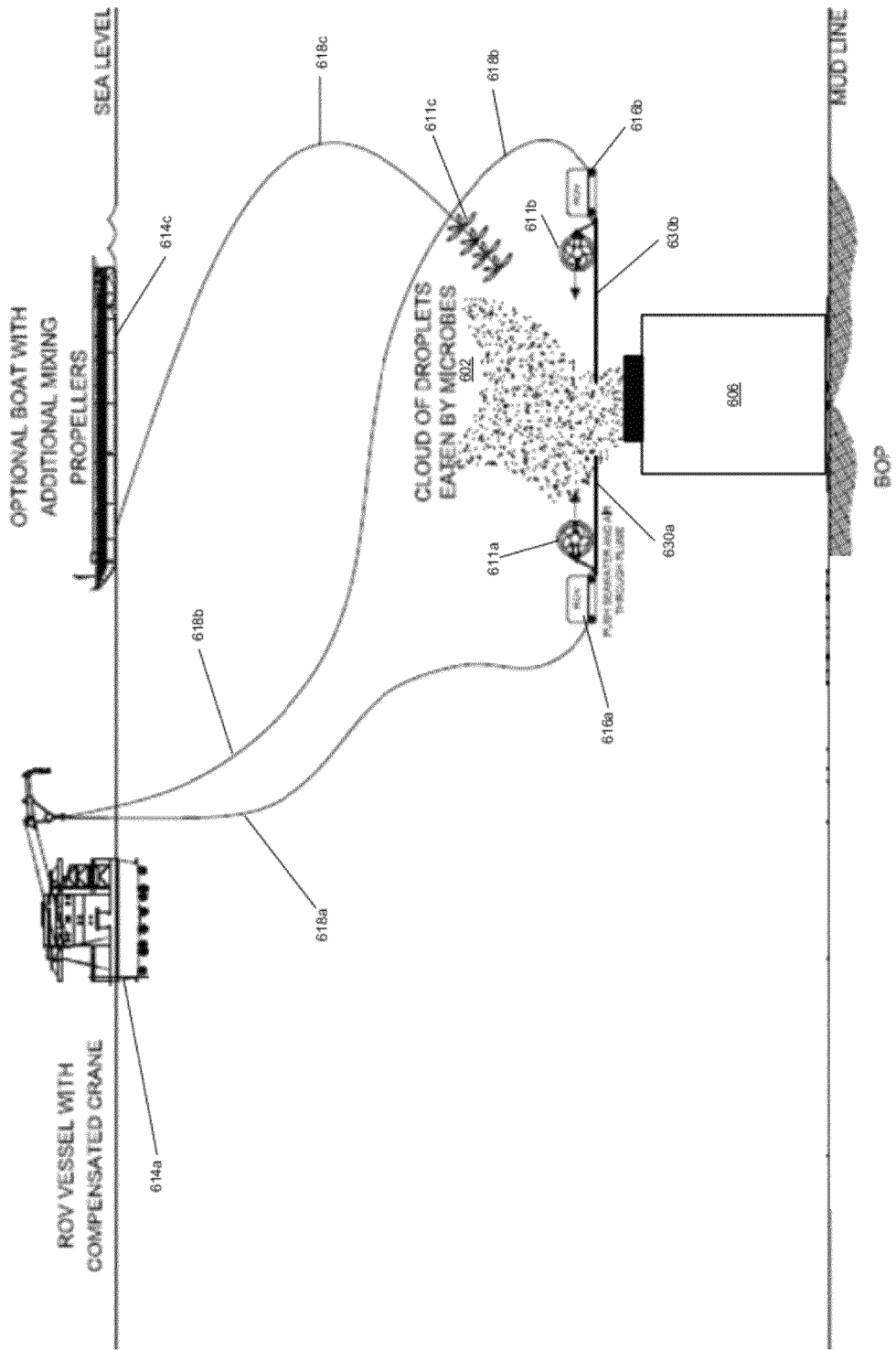
FIGS. 6-8 are illustrations of dispersant injection systems.

FIG. 6:

FIG. 6 shows a vessel 614*a* and vessel 614*c* floating in a body of water. Umbilical 618*a* extends from vessel 614*a* and is connected to remotely operated vehicle (ROV) 616*a*, and umbilical 618*b* extends from vessel 614*a* and is connected to remotely operated vehicle (ROV) 616*b*. ROV 616*a* is connected to a mixer 611*a* and dispersant injecting wand 630*a*. ROV 616*b* is connected to a mixer 611*b* and dispersant injecting wand 630*b*. Umbilical 618*c* extends from vessel 614*c* and is connected to mixer 611*c*.

Subsea blowout preventer 606 has a leak 602 flowing into the body of water. Mixer 611*a*, mixer 611*b*, and mixer 611*c* are used to mix the leak 602 with the water, in order to create small droplets of the leak 602, for example small oil droplets. Dispersant injecting wand 630*a* and dispersant injecting wand 630*b* are used to inject a dispersant into the leak 602.

FIG. 7:

The system illustrated in FIG. 6 may be mobilized to a leak location in a very short period time. After an additional period of time, the system of FIG. 7 may be used which includes additional installed elements which will be explained below.

Figure 7:
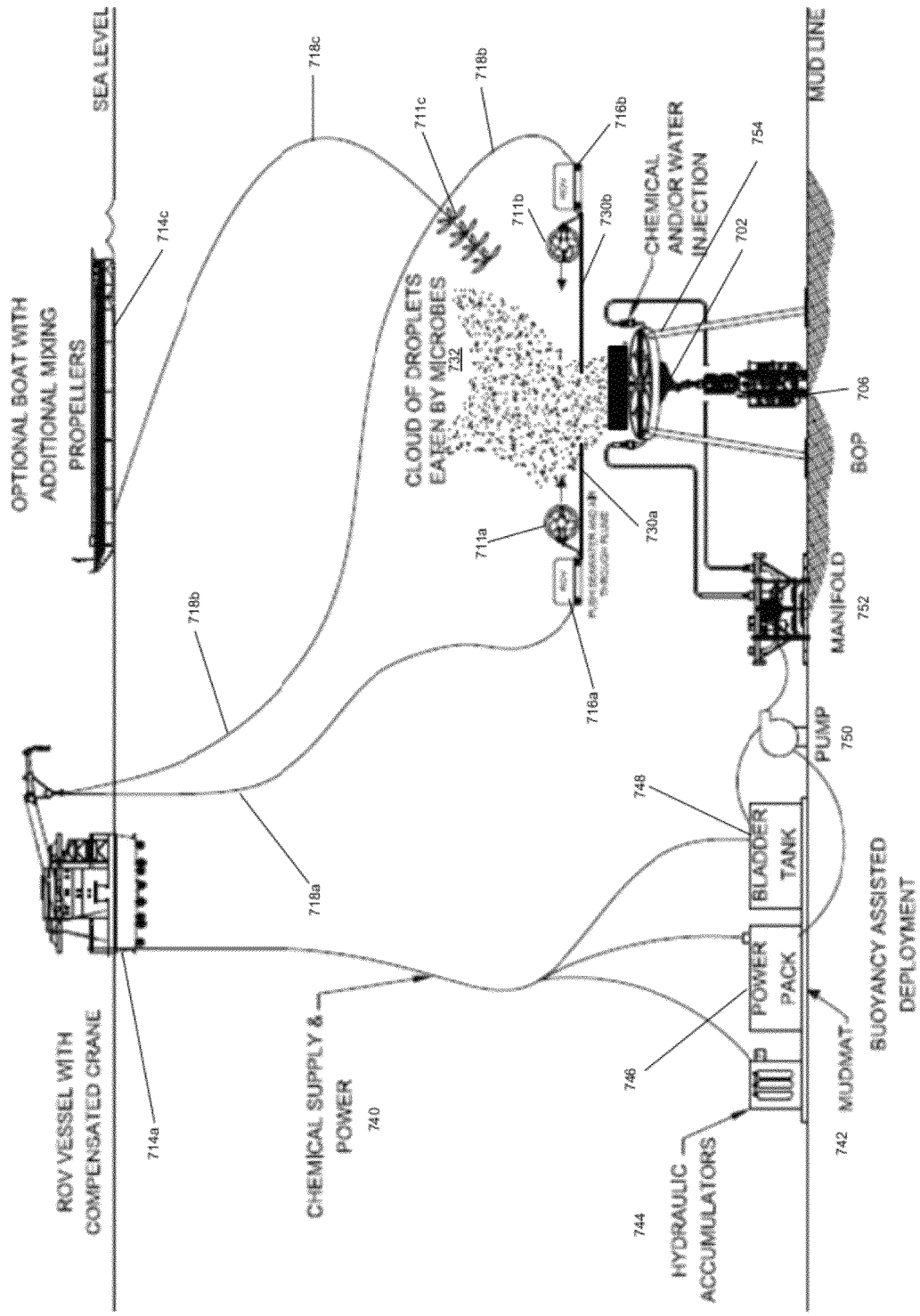

FIG. 7 shows a vessel 714*a* and vessel 714*c* floating in a body of water. Umbilical 718*a* extends from vessel 714*a* and is connected to remotely operated vehicle (ROV) 716*a*, and umbilical 718*b* extends from vessel 714*a* and is connected to remotely operated vehicle (ROV) 716*b*. ROV 716*a* is connected to a mixer 711*a* and dispersant injecting wand 730*a*. ROV 716*b* is connected to a mixer 711*b* and dispersant injecting wand 730*b*. Umbilical 718*c* extends from vessel 714*c* and is connected to mixer 711*c*.

Subsea blowout preventer 706 has a leak 702 flowing into the body of water. Mixer 711*a*, mixer 711*b*, and mixer 711*c* are used to mix the leak 702 with the water, in order to create small droplets of the leak 702, for example a cloud 732 of small oil droplets. Dispersant injecting wand 730*a* and dispersant injecting wand 730*b* are used to inject a dispersant into the leak 702 in order to disperse the leak 702 into a cloud 732 of small droplets, for example droplets having a diameter from about 10 to about 50 microns, for example from about 20 to about 40 microns.

In some embodiments, dispersant may be injected at a rate from about 0.25% to about 5% of the leak 702 volume, for example from about 0.5% to about 2%.

Umbilical 740 extends from vessel 714*a* and is connected to hydraulic accumulator 744, power pack 746, bladder tank 748, and pump 750. One or more of hydraulic accumulator 744, power pack 746, bladder tank 748, and pump 750 may be installed on mud mat 742. Pump 750 may be powered by power pack 746 to pump dispersant stored in bladder tank 748 through manifold 752 and into mixer 754. Mixer 754 may have one or more blades or propellers in a cylindrical housing driven by a motor powered by power pack 746. Mixer 754 acts to shear leak 702 and mix it with dispersant from bladder 754 to create cloud 732.

In some embodiments, bladder tank 748 may have a capacity from about 1000 to about 5000 barrels, for example from about 2000 to about 3000 barrels.

FIG. 8:

The system illustrated in FIG. 6 may be mobilized to a leak location in a very short period time. After an additional period of time, the system of FIG. 7 may be used which includes additional installed elements which will be explained below. The system of FIG. 8 may be used when there are no surface vessels available, for example due to inclement weather such as a hurricane.

Figure 8:
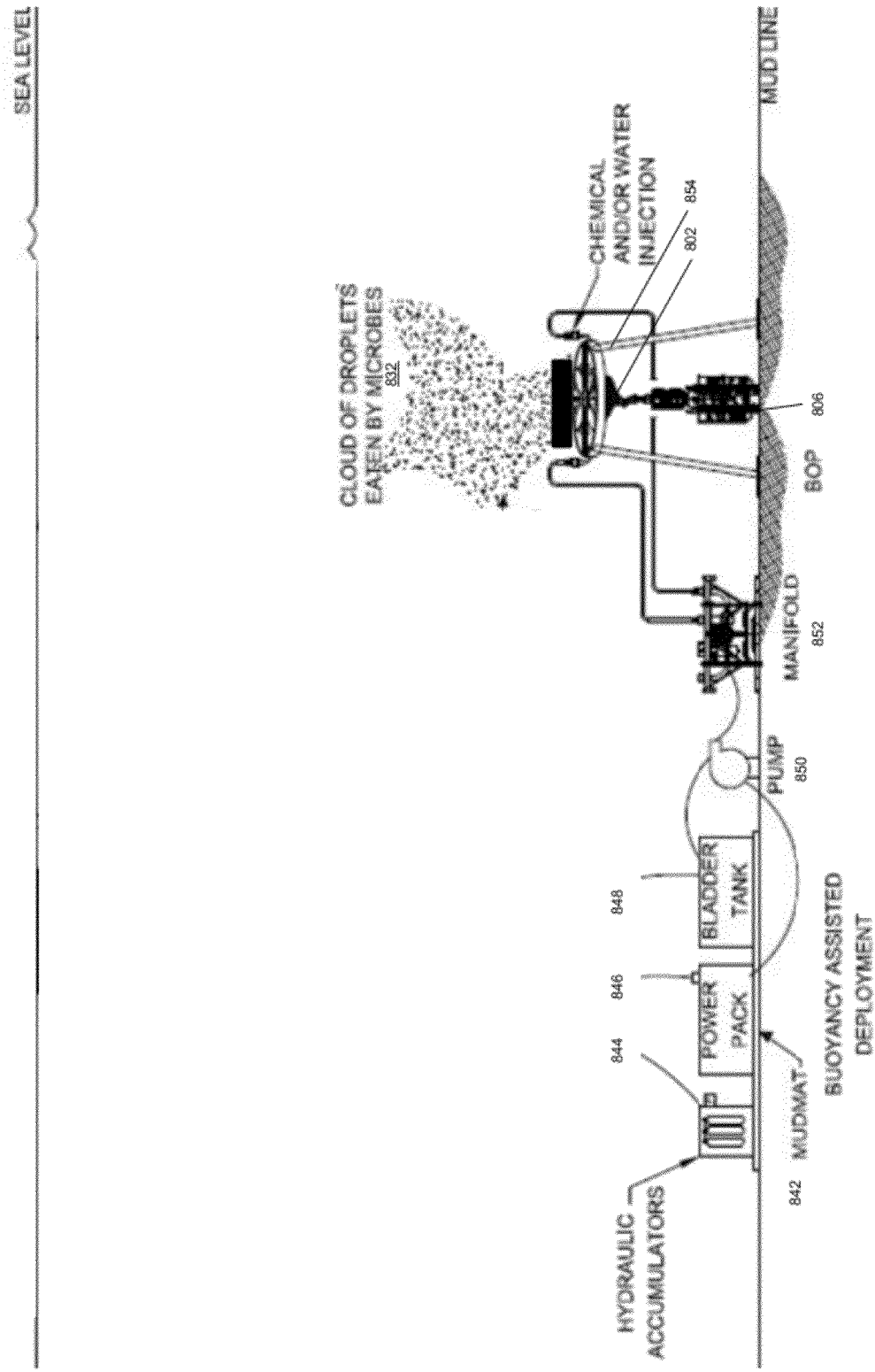

FIG. 8 shows subsea blowout preventer 806 which has a leak 802 flowing into the body of water. Mixer 854 is used to mix the leak 802 with the water, in order to create small droplets of the leak 802, for example a cloud 832 of small oil droplets. Dispersants may be pumped from manifold 852 and mixed with the leak at mixer to inject a dispersant into the leak 802 in order to disperse the leak 802 into a cloud 832 of small droplets, for example droplets having a diameter from about 10 to about 50 microns, for example from about 20 to about 40 microns.

In some embodiments, dispersant may be injected at a rate from about 0.25% to about 5% of the leak 802 volume, for example from about 0.5% to about 2%.

Hydraulic accumulator 844, power pack 846, bladder tank 848, and pump 850 are installed on the sea floor. One or more of hydraulic accumulator 844, power pack 846, bladder tank 848, and pump 850 may be installed on mud mat 842. Pump 850 may be powered by power pack 846 to pump dispersant stored in bladder tank 848 through manifold 852 and into mixer 854. Mixer 854 may have one or more blades or propellers in a cylindrical housing driven by a motor powered by power pack 846. Mixer 854 acts to shear leak 802 and mix it with dispersant from bladder 854 to create cloud 832.

In some embodiments, bladder tank 848 may have a capacity from about 1000 to about 5000 barrels, for example from about 2000 to about 3000 barrels.

In some embodiments, power pack 846 may be a bank of batteries and/or capacitors.

Illustrative Embodiments

In one embodiment, there is disclosed a system comprising a surface vessel floating on a body of water; an oil leak located in the body of water; a remotely operated vehicle located near the oil leak; a connection between the surface vessel and the remotely operated vehicle; wherein the remotely operated vehicle comprises a mixer and a dispersant injector. In some embodiments, the mixer comprises a plurality of rotating blades.

In one embodiment, there is disclosed a system comprising an oil leak located in a body of water; a dispersant storage vessel located near the oil leak; a power supply located near the oil leak; a pump located near the oil leak fluidly connected to the dispersant storage vessel, and connected to the power supply; a mixer located near the oil leak; a dispersant injection nozzle comprising an outlet near the mixer, and comprising an inlet fluidly connected to the dispersant storage vessel and the pump, wherein the pump conveys dispersant from the dispersant storage vessel to the dispersant injection nozzle.

In one embodiment, there is disclosed a system comprising an oil leak located in a body of water; a vessel floating in the body of water; a dispersant storage vessel located on the vessel; a power supply located on the vessel; a pump located on the vessel, fluidly connected to the dispersant storage vessel, and connected to the power supply; a mixer located near the oil leak; a dispersant injection nozzle comprising an outlet near the mixer, and comprising an inlet fluidly connected to the dispersant storage vessel and the pump, wherein the pump conveys dispersant from the dispersant storage vessel to the dispersant injection nozzle.

It will be understood from the foregoing description that various modifications and changes may be made in the preferred and alternative embodiments of the present invention without departing from its true spirit. For example, one or more surface and/or subsea dispersion units (e.g., 110*a,b*, 112*a,b*) and/or one or more vessels (114*a,b*) may be positioned about a wellsite for dispersing and/or mixing fluids. Preferably, the dispersion system 101*a,b* is capable of handling large volumes of dispersants and leaking fluids. If necessary, one or more dispersion systems 101*a,b* and/or individual components thereof may be deployed for use about one or more discharge sources.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

I claim:

1. A system comprising:
   a discharge source leaking fluid into a body of water;
   a mixer submerged in the body of water near the discharge source, wherein the mixer is capable of mixing the leaking fluid;
   a subsea dispersion unit, wherein the subsea dispersion unit is positioned on a mud mat based on the sea floor, wherein the subsea dispersion unit comprises a nozzle submerged in the body of water near the discharge source, and wherein the nozzle is capable of injecting a dispersant into the mixer; and
   a remotely operated vehicle located near the discharge source capable of operating the mixer and the nozzle.

2. The system of claim 1, wherein the mixer comprises a plurality of rotating blades.

3. A system comprising:
   a discharge source leaking fluid into a body of water;
   a dispersant storage vessel located near the discharge source;
   a power supply located near the discharge source;
   a pump located near the discharge source fluidly connected to the dispersant storage vessel and connected to the power supply;
   a mixer submerged in the body of water near the discharge source; and
   a subsea dispersion unit, wherein the subsea dispersion unit is positioned on a mud mat based on the sea floor, wherein the subsea dispersion unit comprises a nozzle submerged in the body of water, wherein the nozzle is capable of injecting a dispersant into the mixer, and wherein the nozzle comprises an inlet fluidly connected to the pump.

4. A system comprising:
   a discharge source leaking fluid into a body of water;
   a vessel floating in the body of water;
   a dispersant storage vessel located on the vessel;
   a power supply located on the vessel;
   a pump located on the vessel, wherein the pump is fluidly connected to the dispersant storage vessel and is connected to the power supply;
   a mixer submerged in the body of water near the discharge source; and
   a subsea dispersion unit, wherein the subsea dispersion unit is positioned on a mud mat based on the sea floor, wherein the subsea dispersion unit comprises a nozzle submerged in the body of water near the discharge source, wherein the nozzle is capable of injecting a dispersant into the mixer, and wherein the nozzle comprises an inlet fluidly connected to the pump.

\* \* \* \* \*